United States Patent [19]

Baier et al.

[11] 4,305,013
[45] Dec. 8, 1981

[54] ENGINE KNOCK SENSOR USING PIEZOELECTRIC ROD OSCILLATOR

[75] Inventors: Paul Baier, Winnenden; Alfred Schulz, Oberriexingen, both of Fed. Rep. of Germany

[73] Assignee: Robert Bosch GmbH, Stuttgart, Fed. Rep. of Germany

[21] Appl. No.: 60,880

[22] Filed: Jul. 26, 1979

[30] Foreign Application Priority Data

Sep. 23, 1978 [DE] Fed. Rep. of Germany ....... 2841553

[51] Int. Cl.³ .......................................... H01L 41/08
[52] U.S. Cl. .................................... 310/330; 310/329
[58] Field of Search ............... 310/345, 346, 330–332, 310/354, 348, 329

[56] References Cited

U.S. PATENT DOCUMENTS

| 2,203,332 | 6/1940 | Kinsley | 310/354 X |
| 3,004,177 | 10/1961 | Sobel et al. | 310/332 |
| 3,093,710 | 6/1963 | Eyck | 310/332 |
| 3,109,153 | 10/1963 | Rodeck | 310/332 |
| 3,313,891 | 4/1967 | Wood | 310/332 |
| 3,500,451 | 3/1970 | Yanoo | 310/331 |
| 3,790,827 | 2/1974 | Brunet et al. | 310/331 X |

FOREIGN PATENT DOCUMENTS

47-2148 1/1972 Japan ................................. 310/354

Primary Examiner—Mark O. Budd
Attorney, Agent, or Firm—Frishauf, Holtz, Goodman & Woodward

[57] ABSTRACT

In order to provide a unitary, rugged and simplified engine knock sensor assembly for internal combustion engines, which is readily tunable after manufacture to particular frequency characteristics of a given engine, the invention provides a cantilevered bending oscillator which is clamped together with a suitable electrical contact in an axial channel of a metallic cylindrical socket. The radial clamping forces are permanently provided by deformation of the socket material, for example by mortising, or other dimensional changes of the socket material. A number of embodiments is presented. The invention also includes a method for simultaneously producing two separate electrical contacts from a single contact element.

5 Claims, 8 Drawing Figures

ENGINE KNOCK SENSOR USING PIEZOELECTRIC ROD OSCILLATOR

FIELD OF THE INVENTION

The invention relates to piezoelectric sensors whose natural resonant frequency is tuned to the frequency of vibrations which occur during engine knock or pinging.

BACKGROUND AND PRIOR ART

In known sensors, for example piezo-ceramic bending oscillators, electric potentials, occurring at the contact surfaces, whose amplitude depends on the amplitude of the bending motion are processed for triggering an alarm circuit permitting the vehicle operator to react accordingly or are directly used to engage the engine ignition and/or fuel metering system. The knock sensors are subject to mechanical and thermal stresses because of their intimate proximity to the internal combustion engines in which they are installed. Furthermore, they must be constructed to fit relatively confined spaces at or near the internal combustion engine. The knock sensors known heretofore in the art are not sufficiently well suited to fulfill these conditions.

THE INVENTION

It is thus a principal object of the present invention to provide an engine knock sensor which can be produced at relatively low cost, is capable of reliable operation and can withstand the stresses in the operating environment of an internal combustion engine. An associated object of the invention is to provide an engine knock sensor which requires only a relatively small amount of space and which is capable of rapid attachment or removal to and from an internal combustion engine.

Briefly, according to the invention, by providing that the engine knock sensor is a bending oscillator, substantially rod-shaped, and mounted in cantilever fashion within a socket parallel to its axis. The sensor rod is provided with an electrical contact with which it is clamped in the socket.

In a particularly suitable embodiment, the socket is a pressed part which has a central channel in which the sensor and the electrical contact are clamped together.

When the bending oscillator exhibits two separate but adjacent contact surfaces, the electrical contacts are advantageously attached by welding or otherwise attaching a single electrically conducting plate to both contact surfaces of the sensor; thereafter the central part of the contacting vane is punched out to thereby form two separate contacts.

Still other features and advantages of the invention will emerge from the description of a number of preferred exemplary embodiments to be read in conjunction with the drawing.

THE DRAWING

DESCRIPTION OF THE PREFERRED EMBODIMENTS

Figure 1:
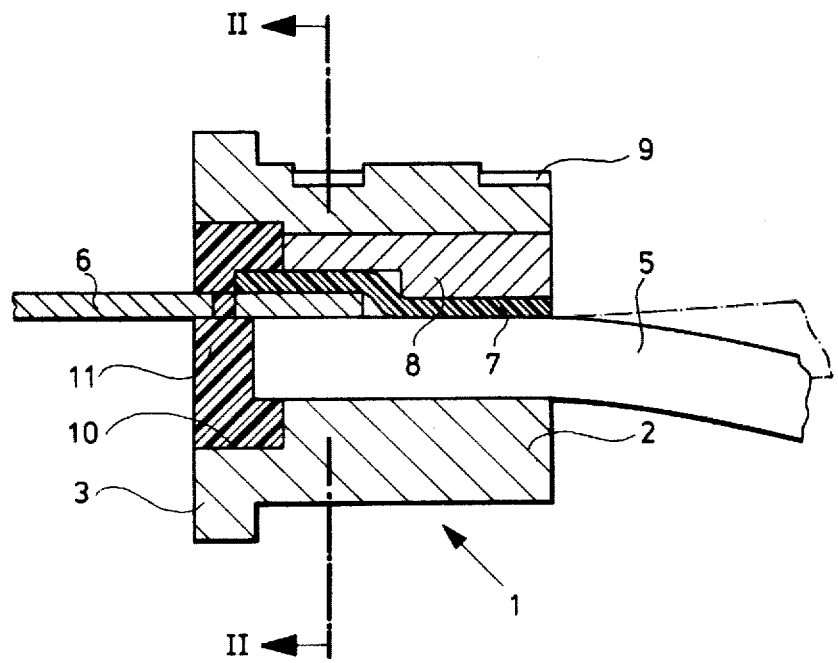
FIG. 1 is an axial cross section of a first embodiment of the invention.
Figure 2:
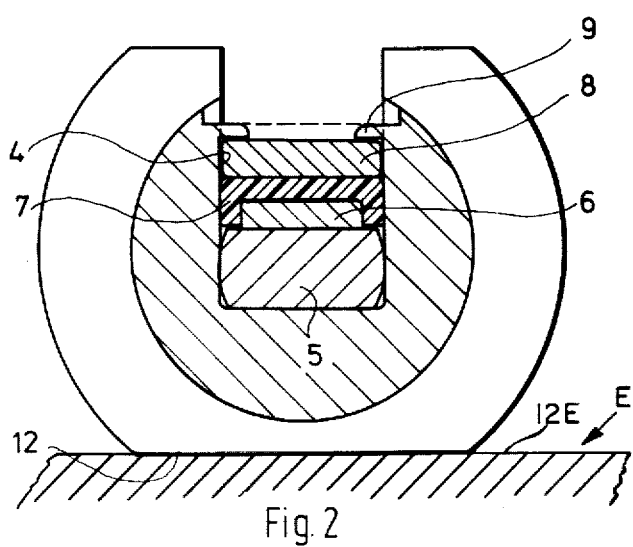
FIG. 2 is a section through the embodiment of FIG. 1 along the line II—II.

The first embodiment of the invention illustrated in FIG. 1 includes a metallic socket 1 having substantially the shape of a circular cylinder 2 with a face flange 3. An axial channel open toward one side extends through the socket 1 to a depth which goes beyond the central symmetry axis of the socket 1. The axial groove or channel 4 holds a rod-shaped bending oscillator 5 which extends at one end to the vicinity of the flange 3 while its other end extends beyond the end face of the cylinder 2. An electrical contact vane 6 is placed on the oscillator 5 at the end adjacent to the flange 3. An insulating plate 7 lies on the oscillator 5 and surrounds the electrical contact vane 6 on three of its sides, as best seen in FIG. 2. Accordingly, the width of the electrical contact vane 6 is smaller than the width of the channel 4 by twice the thickness of the insulating plate 7. A pressure piece 8 is placed on the insulating plate and the entire assembly is then clamped in the channel 4 by mortising which displaces the material of the cylinder 2 so as to produce protruding lips 9 which hold the stack of elements 4, 5, 6, 7 and 8 in position and in firm contact. A recess 10 in the flange 3 may be filled with electrically insulating material 11, for example by pouring. A flat surface 12 is provided on the flange 3, or if the flange 3 be absent, on the cylinder 2 itself and serves to define a particular angle of the top surfaces of the rod-shaped bending oscillator 5 with respect to a corresponding flat surface 12E on a receiver portion of the engine E, shown only schematically.

Figure 3:
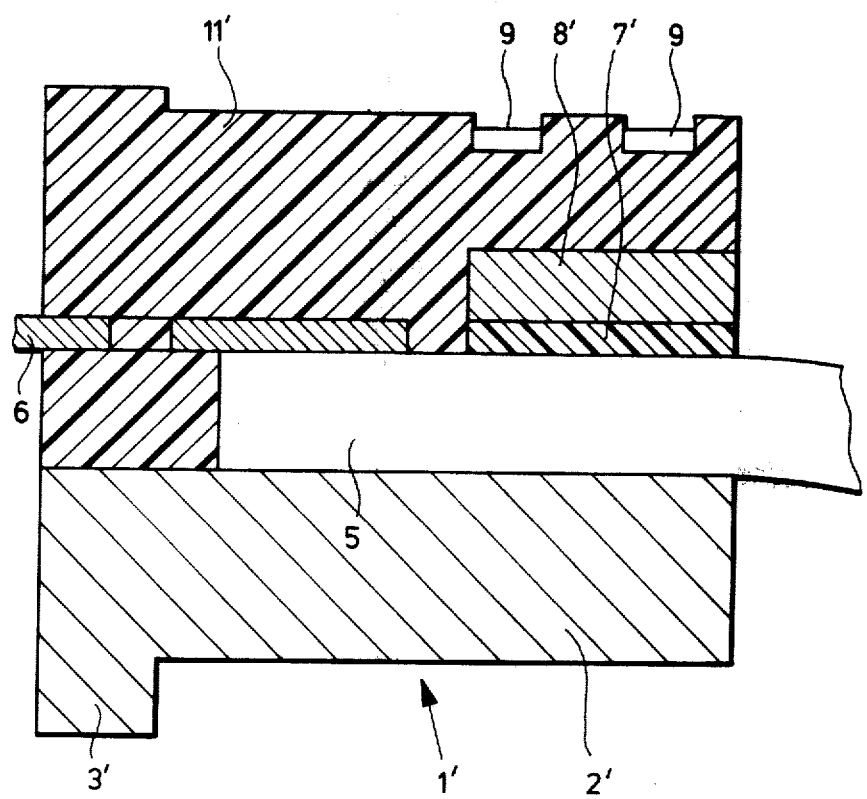
FIG. 3 is an axial section of a second embodiment of the invention.
Figure 4:
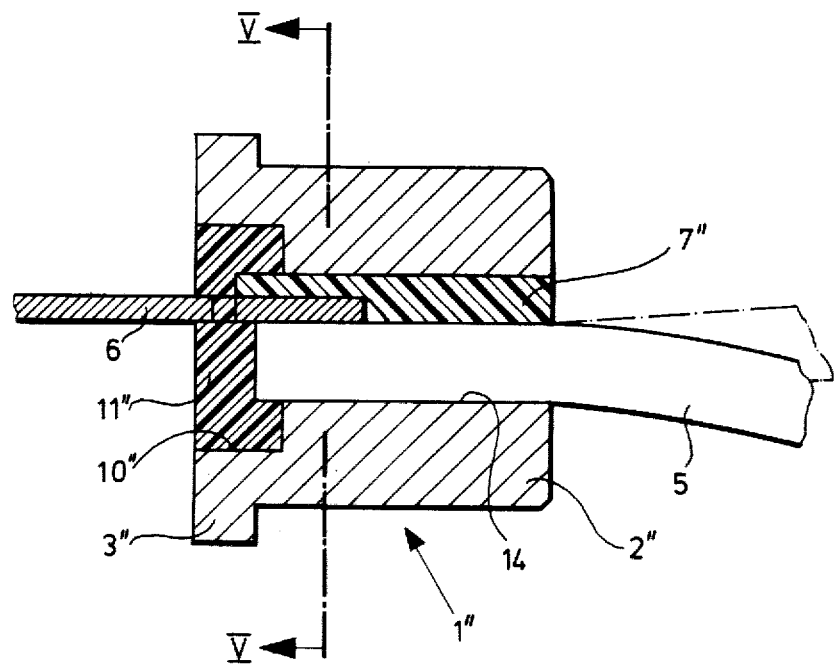
FIG. 4 is an axial section of a third embodiment of the invention.
Figure 5:
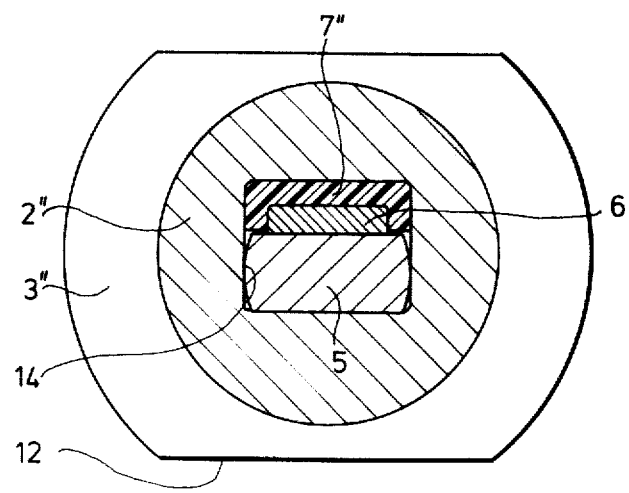
FIG. 5 is a section through the embodiment of FIG. 4 along the line V—V.

In the embodiment illustrated in FIGS. 1 and 2, electrical contact between the vane 6 and the oscillator 5 is obtained by compressive contact between these two parts which is maintained by the pressure exerted by the two lips 9. Alternatively, as illustrated for example in FIG. 3, electrical contact may also be provided by soldering or spot welding. In the embodiment shown in FIG. 3, the receiver 1' includes a cylinder 2' having a flange 3'; the mortising may be done in such a way that the clamping lips 9 lie outside of the region in which the electrical contact is made by soldering or welding. The remaining free space of the channel may be filled with electrically insulating material 11'. Another manner of clamping and holding the bending oscillator 5 is illustrated in the embodiment of FIGS. 4 and 5. A socket 1" embodied as a cylinder 2" has a central channel 14 closed on all four sides and extending through the cylinder 2" as well as the flange 3". In the region of the flange 3", the channel becomes an enlarged recess 10". The bending oscillator 5, an electrical contact vane 6 and an insulating plate 7" are so dimensioned as to be capable of free insertion in the channel. In the region in which it surrounds the contact vane 6, the insulating plate 7" has a U-shaped cross section and in its remaining extent it is substantially of rectangular cross section. After the elements 5, 6 and 7" have been placed in correct alignment in the channel, the radial dimensions of the cylinder 2" are reduced in a known manner, whereby the elements 5, 6 and 7" are clamped together and held rigidly in place. The recess 10″ is thereafter filled with insulating plastic material 11″.

Figure 6:
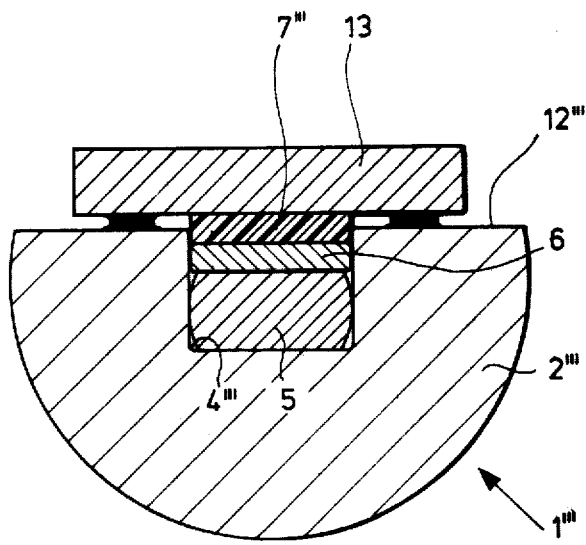
FIG. 6 is a transverse section of a fourth embodiment of the invention.
Figure 8:
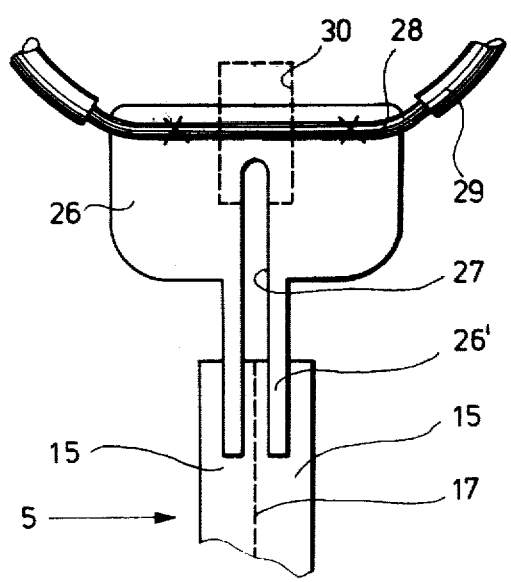
FIG. 8 is a top view of a dual electrical contact vane prior to the application of the final production step.

In a fourth embodiment of the invention illustrated in FIG. 6, the socket 1‴ includes a cylinder 2‴ having an axial groove 4‴ which contains the bending oscillator 5, the contact vane 6 and an insulating plate 7‴. The radial depth of the axial groove 4‴ which is open along one side is so chosen as to be slightly smaller than the combined height of the oscillator 5, the contact vane 6 and the insulating plate 7‴. After placement of these elements in the channel 4‴, a cover plate 13 is placed over the channel 4‴ and is compressed against a flat portion 12‴ of the cylinder 2‴ whereafter it is permanently joined thereto, for example by welding.

Figure 7:
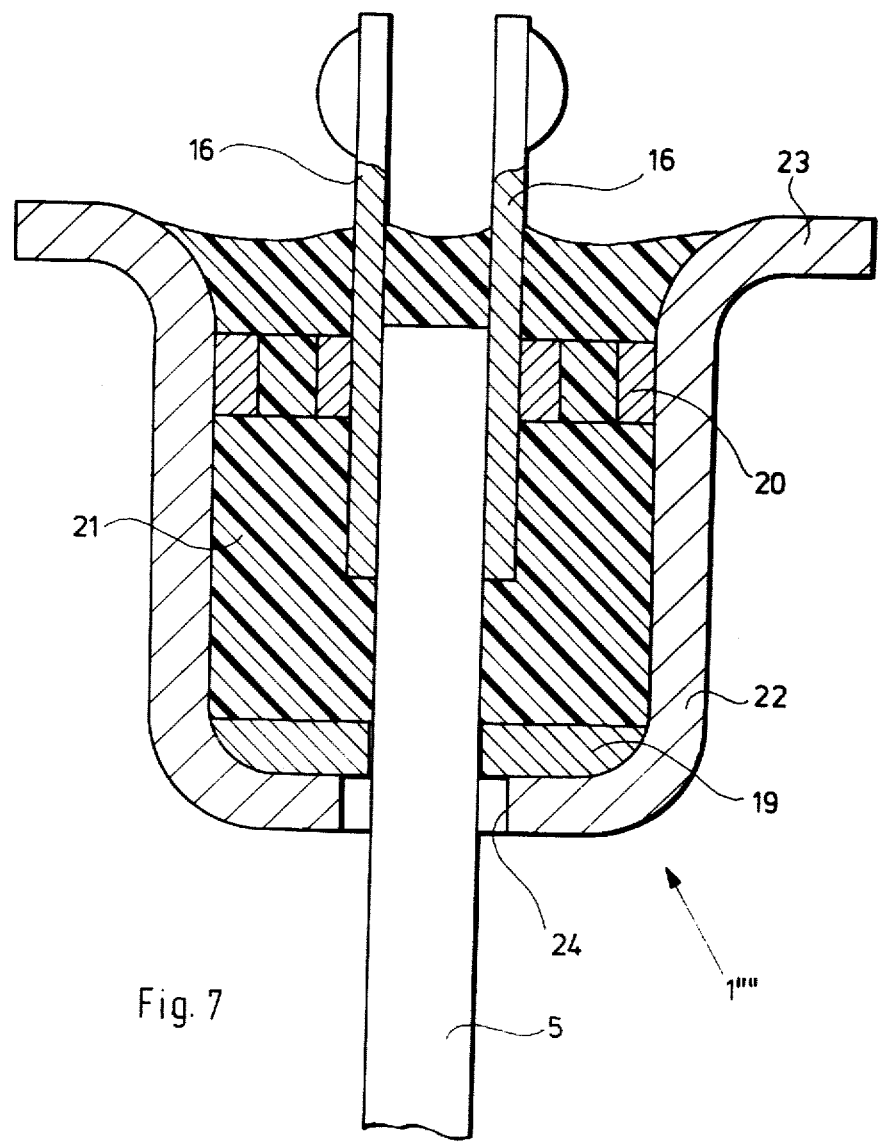
FIG. 7 is an axial section of a fifth embodiment of the invention.

In a fifth embodiment of the invention illustrated in FIG. 7, the socket 1″″ has the shape of a cup 22 with an annular flange 23 at the open end. The bottom of the cup 22 has an opening 24 which is substantially larger in cross section than the lateral extent of the oscillator 5. The bending oscillator 5 is held in place in the cup 22 by, for example, two spacer discs 19 and 20. The disc or piece 19 has a central opening which holds the oscillator firmly and the disc or piece 20 has a central opening which firmly surrounds the oscillator as well as the contact vanes 16. The two spacer discs or pieces 19 and 20 are made from an insulating material. If the spacer discs 19 and 20 fit tightly, no further steps are required to fix the oscillator in place. However, in general, it will be suitable to fill the interior space of the cup 22 with an insulating material 21. Conversely, if the insulating material 21 hardens and becomes sufficiently rigid, it may serve to hold the oscillator 5 in place and the openings in the spacer discs 19 and 20 through which the oscillator 5 passes need not provide a tight fit.

When the bending oscillator 5 is of the type exhibiting two adjacent but electrically separate surfaces 15 which are separated along a line 17, the electrical contact may be established in the following manner. A single contact vane 26 having two extending legs 26′ separated by a slit 27 is placed on the oscillator 5 in such a way that the ends 26′ make contact with respective surfaces 15 of the oscillator 5. A wire 28, part of whose insulation 29 has been removed, is then attached by soldering or welding to the unitary part of the vane 26 which extends beyond the oscillator 5. Thereafter, a cutting die 30 of a press or cutter, not further shown, separates the vane 26 and the central part of the wire 28 so as to extend the slit 27 completely through the vane 26. The removal of metal of the central part of the vane as well as of the wire thus defines two mechanically and electrically separate contact pieces which are thus are already equipped with contact wires for attachment to suitable parts of the engine or the vehicle. However, the ends of the contact vanes 6, 16 may also be shaped so as to permit electrical contact by plugs or by soldering.

When the bending oscillator 5 has been placed and clamped in the receiver in one of the above-described ways, its length is calibrated by controlled grinding so as to exhibit the proper and desired resonant frequency for detecting engine knocks in a particular type of engine.

The foregoing description relates to preferred but merely exemplary embodiments of the invention. Features of one embodiment may be used in any other and still further embodiments and variants are possible without departing from the spirit and scope of the invention.

We claim:

1. In combination with an internal combustion engine (E)
   an engine knock sensor comprising
   an essentially at least part cylindrical, block shaped socket (1) formed with an axial channel (4, 14, 24) and further formed with an external attachment surface (12E) in engagement with a surface of the engine and for transmission of knocking vibration from the engine to the socket;
   a bending oscillator rod (5) having one end portion thereof irremovably and securely retained in the channel of the socket;
   an electrical contact vane or plate (6, 16, 26) engaging a surface of said rod (5) located within said channel;
   an electrically insulating plate (7) retained in said channel and positioned over said contact vane; and
   means for irremovably clamping the end portion of said oscillator rod, said contact vane, and said insulating plate in the channel of the socket in mutually parallel position and parallel to the central axis of the socket comprising
   projecting lips (9) projecting from the socket over said insulating plate and exerting a clamping force through said plate on the electrical contact vane and said oscillator rod to securely and irremovably retain the oscillator rod within the socket.

2. An engine knock sensor according to claim 1 further including a pressure pad (8) retained in said channel (4, 14).

3. An engine knock sensor according to claim 1 further including a pressure pad (8) positioned in said channel beneath said lips;
   and wherein said lips both comprise deformed portions of the socket adjacent the channel.

4. In combination with an internal combustion engine (E)
   an engine knock sensor comprising
   an essentially at least part cylindrical, block shaped socket (1) formed with an axial channel (4, 14, 24) and further formed with an external attachment surface (12E) in engagement with a surface of the engine and for transmission of knocking vibration from the engine to the socket;
   a bending oscillator rod (5) having one end portion thereof irremovably and securely retained in the channel of the socket;
   an electrical contact vane or plate (6, 16, 26) engaging a surface of said rod (5) located within said channel;
   an electrically insulating plate (7) retained in said channel and positioned over said contact vane; and
   means for irremovably clamping the end portion of said oscillator rod, said contact vane, and said insulating plate in the channel of the socket in mutually parallel position and parallel to the central axis of the socket comprising
   the adjacent portions of the socket, said socket being sized by deformation of the socket to thereby irremovably clamp into the socket the portion of the oscillator rod (5) within said channel, said contact vane, and said insulating plate.

5. In combination with an internal combustion engine (E)
   an engine knock sensor comprising
   an essentially at least part cylindrical, block shaped socket (1) formed with an axial channel (4, 14, 24) and further formed with an external attachment surface (12E) in engagement with a surface of the engine and for transmission of knocking vibration from the engine to the socket;

a bending oscillator rod (5) having one end portion thereof irremovably and securely retained in the channel and of the socket;

an electrical contact vane or plate (6, 16, 26) engaging a surface of said rod (5) located within said channel;

an electrically insulating plate (7) retained in said channel and positioned over said contact vane;

and wherein the channel in the socket is radially opened;

and a cover plate (13) is provided, covering the channel at its radially open portion and clampingly retaining said oscillator rod, said electrical contact vane, and the insulating plate in mutually parallel position and parallel to the central axis of said socket, the cover plate being irremovably secured to the socket and exerting a compressive force in the direction of the portion of the oscillator rod (5) retained within said channel.

* * * * *